Patented Aug. 15, 1950

2,519,092

UNITED STATES PATENT OFFICE 2,519,092

COMPOSITIONS OF DIFFERENT STYRENE-ISOBUTYLENE COPOLYMERS

David W. Young, Roselle, and William H. Smyers, Westfield, N. J., assignors to Standard Oil Development Company, a corporation of Delaware No Drawing. Application March 12, 1946, Serial No. 653,955

5 Claims. (Cl. 260—45.5)

The present invention relates to improved plastic compositions, especially to a resinous hydrocarbon polymer composition capable of being easily handled by simple mechanical means and thus converted into molded articles, thin sheets or self-sustaining films, tubes, coating compositions, and the like. The invention will be understood from the following description of the compositions, their ingredients and methods of manufacture.

It has previously been discovered that certain olefins, especially iso mono-olefins such as isobutene, 2-methyl 1-butene, or other lower olefins such as propylene, can be copolymerized with unsaturated hydrocarbon compounds such as alphamethyl styrene, dihydronaphthalene, indene, etc. and vinyl compounds, especially vinyl cyclic hydrocarbons such as styrene, p-methyl styrene, p-chlorstyrene, dichlorstyrene, etc., at low temperatures, well below 0° C., with active halide catalysts such as aluminum chloride, boron fluoride and the like. Such materials are prepared by the procedure described in U. S. Patent 2,274,749 and the materials produced are valuable colorless resins and plastics of high molecular weight. It has further been discovered that the materials made by the general method outlined above differ depending on the particular mono-olefin employed, the particular cyclic compound, the ratio of these two ingredients and finally the temperature of polymerization which is particularly important in its influence on molecular weight.

In general it may be stated that there are two types of compound produced by the above method; the first, which may be termed "A," is a hard brittle resin having a relatively lower molecular weight, ranging from 2,000 to 5,000 according to the Staudinger method and is made by polymerization at about —20° to —40° C. This material is definitely thermoplastic and ordinarily contains from about 30 to 80%, preferably 40 to 75% of the vinyl compound. It is white or colorless, odorless, tasteless and, as stated before extremely brittle so that it is shattered by a blow. These resins have ring and ball heat softening points between about 30 and 110° C., and flash points according to the open cup method of about 400 to 450° F. The molecular weight range given above corresponds to an intrinsic viscosity of about 0.10 to 0.40. The intrinsic viscosity is the viscosity in centistokes at 20° C. of a solution containing 4 grams per 100 cc. of the material in question dissolved in toluene. This material is useful as a hard, brittle resin especially in coating compositions, and must be applied in the same manner as ordinary rosin, preferably by spraying or brushing the melted resin or a volatile solvent solution thereof. It cannot be extruded or calendered because it is much too brittle and while it can be molded like ordinary rosin, the edges and corners readily break off so that it is not suitable for the manufacture of such finished articles by itself.

The second type of compound termed "B," made according to the general disclosure referred to above, is made at a very low temperature, below —50° C. and preferably below —80° C., and may be prepared at temperatures as low as —150° C. Ordinarily it can be made advantageously at the temperature of boiling ethylene which is —103° C. This material is colorless, odorless and tasteless and to some extent thermoplastic, but to a degree somewhat less than the former material. It is tough, non-brittle, flexible and somewhat elastic. It can be stretched considerable and does not shatter under a blow. Its molecular weight is considerable higher than the resin "A," running from say 10,000 to 80,000, or higher on the Staudinger scale, and the intrinsic viscosity ranges from 0.60 to 1.50. Material of this type contains from about 30 to 95% of styrene, preferably from 40 to 80%. It can be employed for many purposes just as it is produced, but it cannot be readily handled by any of the ordinary mechanical methods such as calendering, extruding, and the like. When the pure material is put through rolls (without sizing powders such as zinc stearate, etc), it adheres to the roller and does not produce a suitably thin film or sheet. When it is dissolved in a suitable solvent, which is then allowed to evaporate, the film can be stripped but it does not have sufficient hardness and strength to be attractive for most commercial purposes as a self-sustaining film. It can be extruded to a degree but the material is not wholly satisfactory.

It has now been found that a suitable mixture of the two types of compounds referred to above is far superior to either of the materials alone and for the present purposes the two types of materials must be prepared separately by polymerization of the desired ingredients under the conditions given above. The materials are then admixed in the proper proportion, preferably from 1 to 50% of the lower molecular weight material (A) in the high (B). Very satisfactory materials may be made containing as low as 1% of the lower molecular weight material up to 20%, and 5% to 10% or so appears to be the most satisfactory for sheeting of rolls. The mixtures of low molecular weight isobutylene-styrene copolymers, and high molecular weight isobutylene-styrene copolymers, have low enough viscosity to make them have good value as hot melt coatings. The mixtures can be prepared in many different ways at temperatures ranging from 175 to 330° F. on rubber mills, Banbury mixers or other suitable kneading apparatus, but the preferred procedure is to hot-mix the high molecular weight copolymer and gradually stir into it the low molecular weight copolymer in granular or heat-softened condition. The particular type of apparatus does not appear to be important. The material can also be made by dissolving the ingredients in suitable solvents and allowing the solvent to evaporate. Toluene and other highly aromatic hydrocarbon solvents are best suited for this purpose if the type B copolymer has 50% or more of combined styrene, but if less, then aliphatic solvents such as petroleum naphtha may be used. In order to better understand the desirable properties of the present compositions, the following examples are given:

Various mixtures of isobutene and styrene were copolymerized by means of aluminum chloride in methyl chloride at different temperatures, in order to illustrate the two general types (A and B) of products produced by this means. In the table below, the composition, the temperatures of copolymerization and the significant properties of the products produced are set forth for the two types of compounds referred to hereinbefore:

|  | Per Cent Styrene | Temp. of Copolymerization | Tensile Strength (#/sq. in.)[1] | Per cent Elongation (to break) | Intrinsic Viscosity (in Toluene) | Softening Point (Ring and Ball), °C. |
|---|---|---|---|---|---|---|
| A | | | | | | |
| 1A | 40 | °C. −25 | 55 | 19 | 0.25 | 30 |
| 2A | 50 | −25 | 600 | 0.4 | 0.20 | 50 |
| 3A | 60 | −25 | 920 | 0.1 | 0.15 | 85 |
| B | | | | | | Heat Seal Point (°C.) |
| 1B | 40 | −103 | 1,040 | 720 | 1.3 | 95 |
| 2B | 50 | −103 | 1,580 | 500 | 0.8 | 98 |
| 3B | 60 | −103 | 3,500 | 110 | 0.7 | 108 |

[1] At 20 inches/min. rate of extension.

NOTE: The high molecular weight products when painted from a 10% solution in toluene, benzene, etc., give a final film when stripped from glass that is very weak. This is due to the fact that the molecules are not oriented. However, if some low molecular weight resin is added to the solution (say about 10% by weight calculated on per cent of high molecular weight resin present in solution) an improved cast film is obtained. The low molecciuar weight gives a resin, reinforcing action to the cast film.

Example 1

The low molecular weight copolymer 3A (in the above outline) was compounded by hot milling in two different portions, namely, 5% and 25% by weight, with the high molecular weight copolymer 3B. The physical properties, including intrinsic viscosity, heat seal point, tensile strength and per cent elongation, of the resulting compositions are shown in the following table, together with the corresponding properties of the low and high molecular weight copolymers per se for comparison.

|  | Composition | | | |
|---|---|---|---|---|
|  | Sample 1 | | Sample 2 | |
| Per cent 3A | 0 | 5 | 25 | 100 |
| Per cent 3B | 100 | 95 | 75 | 0 |
| Per cent combined styrene in mixture | 60 | 60 | 60 | 60 |
| Intrinsic Viscosity | 0.70 | 0.68 | | 0.15 |
| Heat Seal Point, °C | 108 | 82 | 80 | (77) |
| Tensile Strength | 3,500 | 2,200 | 990 | 920 |
| Per cent Elongation | 110 | 420 | 520 | 0.1 |

In the above table it is quite evident that even a very small amount of copolymer 3A (low molecular weight) effects a surprisingly great reduction in the heat seal point of copolymer 3B (high molecular weight). The lowering of heat seal temperature is very much greater than would be expected from an arithmetic calculation based on the proportionate effects of the heat seal points of the two separate copolymers. The other striking observation in the above table is that the blends of the high and low copolymers have a much higher per cent elongation than either of the separate copolymers per se.

The blend called sample 1 of the invention, containing 5% of copolymer 3A (low molecular weight), was calendered at 260° F. (top roll temperature) on a three-roll calender. This shows that the low molecular weight copolymer is quite unexpectedly efficient in plasticizing the high molecular weight copolymer as the latter per se is still too rubbery at 275° F. to permit calendering into thin films.

The blend called sample 2, and containing 25% of copolymer 3A (low molecular weight) was compounded at 175° F. on a rubber mill and could be processed with ease. After 10 minutes on the mill the composition was sheeted into a homogeneous thin film.

Example 2

Five per cent (5%) by weight of low molecular weight copolymer 1A in the outline given above, and containing about 40% by weight of combined styrene, was compounded with 95% by weight of high molecular weight copolymer 1B, likewise containing about 40% by weight of combined styrene, and the physical properties of the resulting mixture are shown in the following table together with corresponding properties of these two copolymers per se.

|  | Composition, Sample 3 | | |
|---|---|---|---|
| Per cent 1A | 0 | 5 | 100 |
| Per cent 1B | 100 | 95 | 0 |
| Per cent combined styrene in mixture | 40 | 40 | 40 |
| Intrinsic viscosity | 1.30 | 1.10 | .25 |
| Heat seal point, °C | 95 | 78 | (26) |
| Tensile strength | 1,040 | 880 | 55 |
| Per cent Elongation | 720 | 840 | 19 |

The above table shows that as in the compositions in Example 1 containing 60% combined styrene, here again a blend of high and low molecular weight copolymers, each containing about 40% combined styrene, shows a proportionately great reduction in heat seal point considering that only 5% of the low mol. wt. copolymer is blended with 95% by weight of the high mol. wt. copolymer. Here also this blend has a higher per cent elongation than either of the two copolymers per se instead of an arithmetic average thereof. Also, in the case of these copolymers of only 40% combined styrene, the blend shows a much lower intrinsic viscosity than would be expected from an arithmetic calculation based on the intrinsic viscosities of the separate copolymers per se. The substantial reduction in heat seal temperature and intrinsic viscosity, with improved per cent elongation, indicate an unobvious plasticizing effect, which furthermore corroborated by the fact that the blend representing this Example 3 could be calendered satisfactorily at 250° F. top roll temperature on a three-roll calender, whereas the high mol. wt. copolymer 1B per se requires temperatures in the range of 280–330° F. for smooth sheeting.

The blend of sample 3 (copolymers containing 40% combined styrene) is superior to that of Example 1 (copolymers containing about 60% combined styrene) because it has lower M. V. P. (moisture vapor permeability).

A number of industrial uses, such as preparation of films for capsulating machines for forming capsules, ampuls, etc. have indicated the value of mixtures having a low heat seal point but still having good tensile strength and elongation.

The advantage of substantial reduction in the heat seal point of a high mol. wt. type copolymer such as 3B or 1B, by the use of a relatively small proportion such as 1 to 30%, preferably about 5 to 20%, of low mol. wt. copolymer such as 3A or 1A, becomes even more unobvious and surprising. Referring to the outline of properties of the individual copolymers per se given just before Examples 1 and 2, it is noted that as the combined styrene content of the high mol. wt. copolymers per se is reduced from 60 to 50% the heat seal point is reduced 10° (108 to 98° C.), but when the styrene content is further reduced from 50 to 40 the heat seal point is only reduced 3° further (from 98 to 95° C.), so it is apparent that no matter how much further the styrene content might be reduced, it would be impossible to obtain a heat seal point as low as 90° C. with any one of these high mol. wt. copolymers per se. It is therefore so much the more surprising that as little as 5% of a low mol. wt. copolymer readily reduces the heat seal point down to 82° C. in Example 1 and to 78° C. in Example 2. It should also be noted that when the heat seal temperature is reduced by adding a small amount of low mol. wt. copolymer, the intrinsic viscosity is reduced, whereas when the heat seal temperature is reduced merely by making a copolymer having a lower combined styrene content, the intrinsic viscosity is raised.

Although the high and low copolymers of substantially identical combined styrene content were mixed together in Examples 1 and 3, other modifications of the invention comprise blending high and low mol. wt. copolymers of different combined styrene content, such as by compounding 5% of copolymer 3A with 95% of copolymer 1B, or by compounding 5% of copolymer 1A with 95% of copolymer 3B.

A further modification of the invention comprises reversing the proportions in which the high and low copolymer compounded. For instance, the incorporation of about 5 or 10% of a high mol. wt. copolymer such as 1B or 3B, in 90 or 95% of a low mol. wt. copolymer of the hard brittle variety such as 1A or 3A, makes an unexpectedly great reduction in the brittleness of the low mol. wt. copolymer, and greatly reduces the tendency of melted batches thereof, or solvent solutions thereof, to penetrate into porous surfaces, e. g. wood, brick, tile, etc., to which it is applied.

Compositions comprising a mixture of high and low mol. wt. cyclic-aliphatic copolymers, such as the various styrene-isobutylene copolymers discussed, also have better film adhesion characteristics than either of the two separate copolymers, and therefore these various blends are useful for calendering copolymer films onto other sheet material such as metal foil, regenerated cellulose, cellulose acetate, glass, etc., especially for making composite laminated products such as safety glass. For this latter purpose it is preferable to use a copolymer mixture having an intrinsic viscosity greater than 0.5 and preferably greater than 0.8, and having a heat seal point below about 85° C. These various copolymer mixtures may also be calendered onto other types of flexible sheet material such as paper, cloth, etc. or used as moistureproof bonding material for laminating two or more layers of various flexible sheet material. They may also be used to coat rigid articles such as to make an inner lining for metal pipes, metal cans such as beer cans or various metal cans for preserving fruits and vegetables, or for packaging and shipping chemicals and other supplies. These copolymer compositions are especially well adapted for calendering into thin flexible self-supporting moistureproof, odorless, tasteless and substantially colorless films, particularly adapted for wrapping individual fruits and vegetables such as apples, bananas, oranges, potatoes, as well as other food products such as cheese, packages of dried fruits, etc.

*Example 3*

A type A copolymer was prepared by copolymerizing a mixture of 70% by weight of styrene and 30% by weight of isobutylene at −25° C. using an AlCl₃ in CH₃Cl catalyst, and the resultant copolymer was found to have a tensile strength of 1,700 lbs./sq. in., and a per cent elongation of .08, intrinsic viscosity of .10, and a softening point (ring and ball method) of 105° C. A type B copolymer was also prepared by copolymerizing a similar mixture of 70% styrene and 30% isobutylene, at −103° C., and then the resulting high mol. wt. copolymer was mixed in about equal portions by weight with the low mol. wt. copolymer of similar chemical composition just described, and the resulting mixture of high and low mol. wt. copolymers of about 70% combined styrene content, were dissolved in toluene to a viscous but spreadable consistency. This coating composition made an unexpectedly superior treating material for wood, by partial impregnation but leaving a smooth glossy continuous film on the surface thereof. This composition is also adapted for making a moistureproof and chemical-resistant glazed film on tile, bricks, concrete, etc. By reducing the proportion of type A copolymer in this blend to from 1 to 25% or so, preferably about 5 to 15%, a composition may be made which is useful for impregnating flexible fibrous materials such as paper and cloth.

*Example 4*

A type B copolymer of 70% combined styrene, and high intrinsic viscosity, as used in Example 3, was compounded with minor proportions of a type A copolymer of about 40% combined styrene and proportions found most suitable for sheeting into thin films comprised about 10 to 30% by weight of the type A copolymer, with 70 to 90% by weight of the type B copolymer, the preferred proportions being about 20% and 80% respectively. Neither of the copolymers per se could be sheeted satisfactorily.

It will be understood that while the primary copolymers A and B are described as types and while they are generally similar their properties can be modified in various ways for example, by adjusting the proportions of the copolymerized ingredients among themselves, and also by change in the polymerizing temperature. In this manner while the general nature of the copolymers remains about the same, it is possible to obtain various degrees of blends which are preferred for definite purposes.

One example of variation is to be particularly noted and this is obtained by adding to the original copolymer ingredients relatively small amounts of certain aliphatic diolefins such as butadiene, isoprene, dimethylbutadiene. It is found that this material enters the copolymer, when used in small amounts ranging from .10% to 10%, but preferably .5 to 5% to give a copolymer which is vulcanizable with sulfur if more powerful accelerators such as tetramethyl thiuram disulfide, mercapto-benzothiazole are used or other known accelerators of equal or greater power. Now sulfur cure can be effected by means of paraquinone dioximes and dinitroso-aromatics and related materials. Thus, the A and B resins, or both, may be prepared with small amounts of diolefins so as to give a product with an iodine number of 1 to 20. After admixture the blends of modified A and B may then be vulcanized as stated.

We claim:

1. A composition consisting essentially of about 95% by weight of styrene-isobutylene copolymer having about 60% by weight of combined styrene, an intrinsic viscosity of about 0.7, a tensile strength of about 3500 lbs./sq./in., a heat-sealed point of about 108° C., and an elongation of about 110%, said copolymer having homogeneously compounded therewith about 5% by weight of styrene-isobutylene copolymer also having a combined styrene content of about 60% by weight but having an intrinsic viscosity of about 0.15, a tensile strength of about 920 lbs./sq./in. and an elongation of about 0.1%, said blended copolymer composition having a tensile strength of about 2200 lbs./sq./in., a heat-sealed point of about 82° C. and an elongation of about 420%.

2. A composition comprising a physical mixture of two separately copolymerized materials, the one copolymer being a hard and brittle copolymer having an intrinsic viscosity of 0.1 to 0.4 and a molecular weight of 2000 to 5000 and being a copolymer of 30 to 80% by weight of a styrene type compound selected from the group consisting of styrene, methyl-substituted styrene, and styrene having 1 to 2 chlorine atoms substituted on the ring, and 70 to 20% by weight of isobutylene, the other copolymer having an intrinsic viscosity of 0.6 to 1.5 and a molecular weight of 10,000 to 80,000, being tough and resilient and being a copolymer of 30 to 95% by weight of a styrene-type compound selected from the group consisting of styrene, methyl-substituted styrene, and styrene having 1 to 2 chlorine atoms substituted on the ring, and 70 to 5% by weight of isobutylene.

3. A composition according to claim 2 containing a major proportion of the tough resilient copolymer and a minor proportion of the hard brittle copolymer.

4. A composition comprising a physical mixture of two separately copolymerized materials, the one copolymer being a hard and brittle copolymer having an intrinsic viscosity of 0.1 to 0.4 and a molecular weight of 2000 to 5000, and being a copolymer of 40 to 75% by weight of a styrene-type compound selected from the group consisting of styrene, methyl-substituted styrene, and styrene having 1 to 2 chlorine atoms substituted on the ring, and 60 to 25% by weight of isobutylene, the other copolymer having an intrinsic viscosity of 0.6 to 1.5 and a molecular weight of 10,000 to 80,000, being tough and resilient and being a copolymer of 40 to 80% by weight of a styrene-type compound selected from the group consisting of styrene, methyl-substituted styrene, and styrene having 1 to 2 chlorine atoms substituted on the ring, and 60 to 25% by weight of isobutylene.

5. A composition comprising a physical mixture of two separately copolymerized hydrocarbon copolymers, the major proportion being a tough resilient copolymer having an intrinsic viscosity of 0.6 to 1.5 and a molecular weight of 10,000 to 80,000 and having 40 to 80% by weight of combined styrene and 60 to 20% by weight of combined isobutylene, a minor proportion comprising 1 to 20% by weight of said composition being a copolymer having an intrinsic viscosity of 0.1 to 0.4 and a molecular weight of about 2000 to 5000, and being a hard, brittle copolymer containing 30 to 80% by weight of combined styrene and 70 to 20% by weight of combined isobutylene, the heat seal point of the mixed composition being much lower than the heat seal point of the tough resilient copolymer, and the per cent elongation of the mixture being much higher than that of either of the separate copolymers, and said composition being capable of being sheeted into thin self-sustaining films.

DAVID W. YOUNG.
WILLIAM H. SMYERS.

REFERENCES CITED

The following references are of record in the file of this patent:

UNITED STATES PATENTS

| Number | Name | Date |
|---|---|---|
| 1,984,678 | Herrmann | Dec. 18, 1934 |
| 2,213,423 | Wiezevich | Sept. 3, 1940 |
| 2,274,749 | Smyers | Mar. 3, 1942 |
| 2,371,499 | Britton et al. | Mar. 13, 1945 |
| 2,386,995 | Wigal | Oct. 16, 1945 |
| 2,436,842 | Warner et al. | Mar. 2, 1948 |

OTHER REFERENCES

Mason and Manning: "The Technology of Plastics and Resins," pages 49–51, published by D. Van Nostrand, N. Y., 1945.